No. 690,361. Patented Dec. 31, 1901.
S. C. C. CURRIE.
PROCESS OF TREATING METALLIC ORES.
(Application filed Feb. 27, 1901.)
(No Model.)
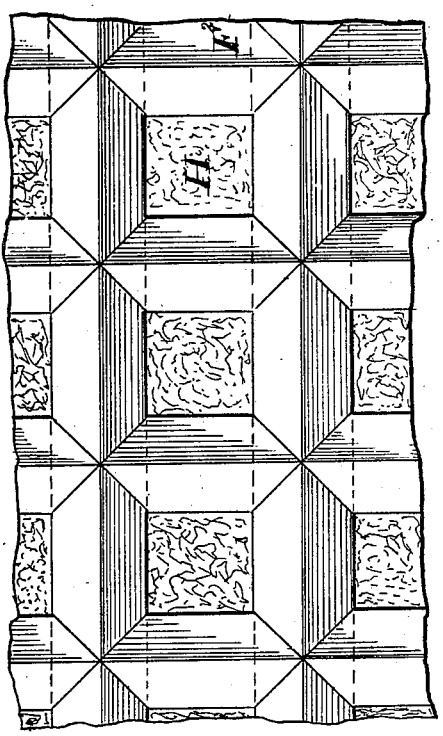
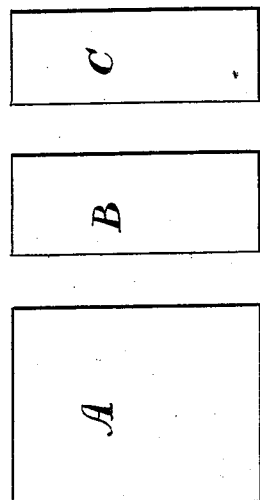
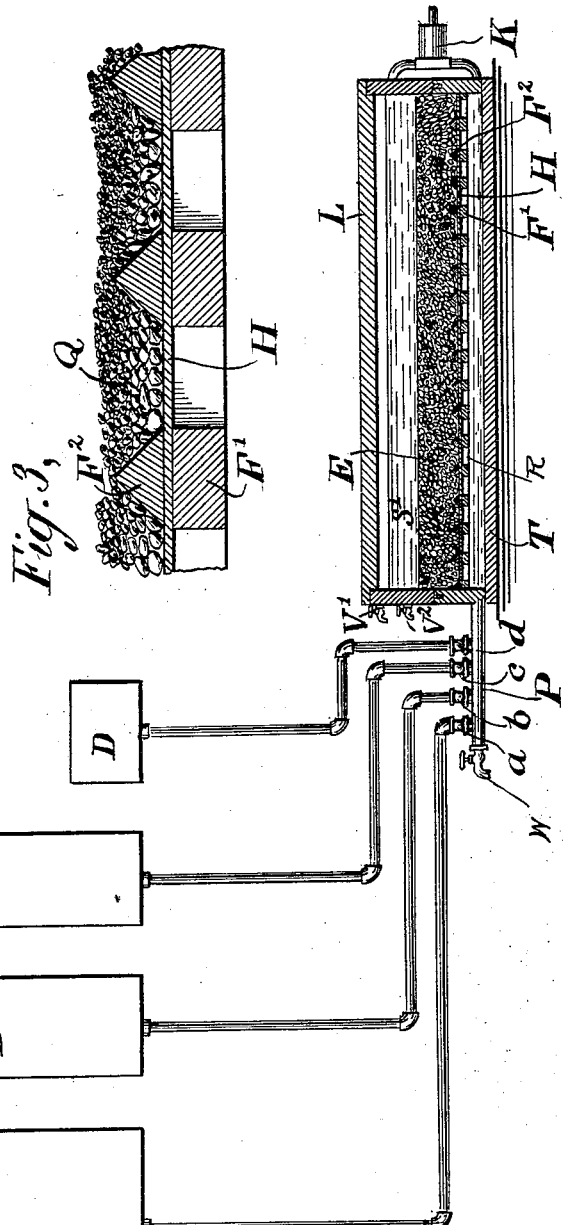
WITNESSES:
INVENTOR
Stanley C. C. Currie,
BY
his ATTORNEY

UNITED STATES PATENT OFFICE.

STANLEY C. C. CURRIE, OF NEW YORK, N. Y., ASSIGNOR TO HIMSELF, AND EDWARD N. DICKERSON, OF STOVALL, NORTH CAROLINA.

PROCESS OF TREATING METALLIC ORES.

SPECIFICATION forming part of Letters Patent No. 690,361, dated December 31, 1901.

Application filed February 27, 1901. Serial No. 49,069. (No specimens.)

*To all whom it may concern:*

Be it known that I, STANLEY C. C. CURRIE, a subject of the King of Great Britain, and a resident of the borough of Manhattan, in the city and State of New York, have invented a new and useful Improvement in Processes of Treating Metallic Ores, of which the following is a full, true, and exact description, reference being had to the accompanying drawings.

My invention relates to a method of treating metallic ores, being an improvement on what is generally known as the "vat" process. It is particularly applicable to the chlorination of auriferous concentrates, and especially to the process as described in my patent of the United States No. 604,167, granted May 17, 1898. It can, however, be applied to the extraction of gold and other metals by any suitable solvent.

My process may be carried out with various apparatus, of which I describe one.

In the accompanying drawings, Figure 1 represents a vertical elevation, partly in section, of my apparatus; Fig. 2, a plan of my treating-vat, and Fig. 3 a cross-section.

The following is a description of my apparatus.

T is a vat made of wood or any other suitable material, preferably coated inside with a paint or substance capable of preventing the acids or chlorin in the solution from acting on the material of which the tank is made. The tank may be of any suitable breadth or depth.

At a short distance above the bottom of the tank is a perforated false bottom consisting of two layers F' F², between which may be placed a sheet of asbestos or other material. One form of the false bottom which I prefer is that as shown in section, Fig. 3, and plan, Fig. 2, F' being a section of the lower perforated plate and F² the upper. H is the asbestos cloth spread and held in place between F' and F². The spaces Q above H are filled with quartz, sand, or other suitable material of different sizes. The false bottom rests upon suitable supports R R. As in the ordinary vat process, the ore E lies in the top of the false bottom to any suitable thickness.

V' V² are valves.

K is a pump the action and use of which will be hereinafter described.

A, B, C, and D are tanks as applied to my process above referred to. A contains water, and B a solution containing a hypochlorite and chlorin or a hypochlorite alone, such as hypochlorite of sodium, (NaOCl,) the proportion of hypochlorite being in this tank greater than in C, in which there is a small percentage of hypochlorite. For example, assuming the liquids are made by passing chlorin gas into a solution of caustic soda, there may be put in B a two to three per cent. solution of caustic soda and in C from one-quarter to one-half of one per cent. of caustic soda, together with an excess of free chlorin in each—that is to say, up to saturation—or, as already stated, the solution in B may be simply a hypochlorite without an excess of the free chlorin.

D is a tank containing an acid, such as sulfuric acid, diluted or not, as the circumstances may require.

Tanks A, B, C, and D have valved pipes communicating with pipe P.

I will now describe the process: After the ore E, such as finely-crushed and roasted sulfurets, (concentrates,) has been placed in the tank the valve $a$ is opened, allowing water alone to pass up through the ore, flowing out through valve V' or V², as may be required. The purpose of this is to thoroughly wash out any slimes, dirt, or useless matter as well as any soluble salts. The flow of water must be so regulated as to simply clean and not disturb too much of the ore itself, and the water should be allowed to flow until it becomes perfectly clear at the outlet-valve. Of course the flow and time must depend upon the nature of the ore. As soon as the water becomes perfectly clear and all soluble salts have been washed out the valve $a$ is closed and the cock W opened, so as to empty the vat. As soon as a sufficient amount of water has flowed out—such, for example, as all above the ore—the cock W is closed and $b$ or $c$ opened—for instance, let it be $c$—thus allowing the chlorin solution containing the small percentage of hypochlorite to flow up through the ore to a suitable distance above. The valve $c$ is then closed. The pump K is now started, the direction of the flow being preferably such as to cause the solution in the vat to flow through the pump and up through the ore. The pump may be so arranged as to reverse the direction of flow, if necessary, from time to time. The nature of the solution may be tested by valve $V^2$ or any other suitably-placed valve, and if, for example, the solution shows too much acid the proper proportion of liquor from tank B may be run in, the acid in the vat being neutralized by the hypochlorite and at the same time free chlorin is liberated from the latter. If, on the other hand, the solution remains or becomes too alkali, acid can be run in from the acid-tank D. Again, if the excess of chlorin fall too low, a fresh amount can be supplied from tank B or C, or a combination of both, or from B and D.

The great advantage of my method, as above described, is the fact of being able to regulate the flow, the amount, and the exact proportions of the various constituents and solutions, so as adjust the same to the requirements of any particular ore. By this method any variation in the chemical constituents or any variation in the roasting of the concentrates, for example, can be easily and effectually made by the proportion of acid, alkali, and chlorin. By this method also a wasteful excess of chlorin can be avoided, allowing only such amount as will be absorbed by the solutions to be present. Thus I have found that it is not necessary to have a hermetically-closed vat, an ordinary cover, such as L, sufficient to prevent any current of air through the top of the vat, being all that is necessary. I have not in the above shown any method of feeding in and washing out the ore, which of course can be done by any of the well-known methods. It will be noted that after the gold has been dissolved the apparatus is self-filtering. The solution can be either drawn off clear at the top by valve $V'$ or $V^2$, at the same time allowing fresh water to pass from tank A up through the ore, thus washing by its upward flow, or the solution can be drawn off clear at the bottom through cock W, or, as I have found advantageous in some cases, a combination of both. Thus I may draw off at $V^2$ at first and afterward at W, then again at the top valve, and lastly at the cock W. The adjustability and ease of operation and at the same time the fact of being able to keep the nature of the solution under complete control are the great features of my invention. The fact of first washing the ore with water is also an important feature, which, besides getting rid of any slimes, also carries off various undesirable substances and salts which are soluble in the water. It must be observed that I might first saturate the ore with the hypochlorite solution from tank B and then run in the dilute acid solution, thus generating chlorin in the ore during the passage of the latter, or vice versa. In fact, the various combinations are too numerous to describe in detail.

What I claim as my invention, and desire to secure by Letters Patent, is—

1. The process of treating precious ores which consists of treating them with a hypochlorite and an acid, and in maintaining the resulting solution substantially neutral by varying the amount of acid or alkali in said solution, substantially as described.

2. A process for treating precious ores, consisting in washing them with water to remove the impurities therefrom, separately subjecting the washed ores to solutions containing chlorin and dilute acid respectively, and then driving off said solution by passing water through the ores.

3. A process for treating precious ores consisting in treating the ores with a solution containing chlorin and an acid, and then suitably maintaining the resulting solution neutral.

4. A process for treating sulfureted ores containing acid, consisting in treating the ores with a solution containing chlorin and a hypochlorite, and then varying the amount of hypochlorite during the treatment so as to maintain the resulting solution free from acid.

5. A process for treating sulfureted ores containing acid, consisting in washing them with water to remove all impurities therefrom, subjecting the washed ores to a solution containing chlorin and a hypochlorite, and varying the amount of hypochlorite during the treatment of the ores, so as to maintain the resulting solution free from acid.

In testimony whereof I have signed my name to this specification in the presence of two subscribing witnesses.

STANLEY C. C. CURRIE.

Witnesses:
 GEO. E. CRUSE,
 CHARLES S. JONES.